US011063760B2

(12) United States Patent
Subba

(10) Patent No.: US 11,063,760 B2
(45) Date of Patent: Jul. 13, 2021

(54) METHOD FOR ENSURING SECURITY OF AN INTERNET OF THINGS NETWORK

(71) Applicant: Sasken Technologies Ltd, Bengaluru (IN)

(72) Inventor: Girish Banavathi Venkata Subba, Bengaluru (IN)

(73) Assignee: SASKEN TECHNOLOGIES LTD, Bengaluru (IN)

( * ) Notice: Subject to any disclaimer, the term of this patent is extended or adjusted under 35 U.S.C. 154(b) by 55 days.

(21) Appl. No.: 16/439,995

(22) Filed: Jun. 13, 2019

(65) Prior Publication Data

US 2020/0067708 A1 Feb. 27, 2020

(30) Foreign Application Priority Data

Aug. 22, 2018 (IN) ............................ 201841031457

(51) Int. Cl.
*H04L 9/32* (2006.01)
*H04L 9/08* (2006.01)
*H04L 29/06* (2006.01)

(52) U.S. Cl.
CPC .............. *H04L 9/321* (2013.01); *H04L 9/085* (2013.01); *H04L 9/0861* (2013.01); *H04L 9/0894* (2013.01); *H04L 9/3226* (2013.01); *H04L 9/3236* (2013.01); *H04L 9/3263* (2013.01); *H04L 63/0435* (2013.01); *H04L 2209/38* (2013.01)

(58) Field of Classification Search
CPC ....... H04L 9/321; H04L 9/085; H04L 9/0861; H04L 9/0894; H04L 9/3226; H04L 9/3236; H04L 9/3263; H04L 63/0435
USPC .......................................................... 713/156
See application file for complete search history.

(56) References Cited

U.S. PATENT DOCUMENTS 10,162,968 B1 * 12/2018 Kumar .................. H04L 9/0891
2018/0287780 A1 * 10/2018 Safford ................... G06F 21/51
2019/0268466 A1 * 8/2019 Inoue .................... H04L 9/3247
2019/0333059 A1 * 10/2019 Fallah .................. H04L 9/3239
(Continued)

OTHER PUBLICATIONS

Ansey et al., "Gnomon: Decentralized Identifiers for Securing 5G Iot Device Registration and Software Update", doi: 10.1109/GCWkshps45667.2019.9024702, 2019, pp. 1-6 (Year: 2019).*
(Continued)

*Primary Examiner* — Peter C Shaw

(57) ABSTRACT

A mechanism for registering a device with an Internet of Things (IoT) edge network is disclosed. The manufacturer of the device stores credentials of the device in a secure storage of the device. The manufacturer also stores the credentials on a public blockchain with sensitive parameters hashed or encrypted. A certifying node accesses the credentials from the public blockchain to establish a secure connection with the device and to verify its credentials. The device sends the credentials to the certifying node, only if the certifying node is able to decrypt a device access parameter from the public blockchain. Upon verifying the credentials of the device, the certifying node issues a digital certificate to the new device and it is stored on a permissioned blockchain within the IoT network. Other nodes in the IoT network may use the digital certificate on the permissioned blockchain for secure communication with the device.

9 Claims, 6 Drawing Sheets

100
IOT SECURITY MECHANISM – REGISTRATION USING PUBLIC BLOCKCHAIN
PUBLIC BLOCKCHAIN WITH IOT SECURITY APP
105
PUBLIC BLOCKCHAIN
SMART CONTRACT
135
SMART CONTRACT
SMART CONTRACT
130
110
120
IoT EDGE NETWORK
GW
DEALER
125
115
NEW DEVICE CREATION BY MANUFACTURER

(56) References Cited

U.S. PATENT DOCUMENTS

2019/0349261 A1* 11/2019 Smith ................ H04L 67/1046

OTHER PUBLICATIONS

Guin et al., "Ensuring Proof-of-Authenticity of IoT Edge Devices Using Blockchain Technology", doi: 10.1109/Cybermatics_2018.2018.00193, 2018, pp. 1042-1049. (Year: 2018).*

Tedeschi et al., "When Blockchain Makes Ephemeral Keys Authentic: A Novel Key Agreement Mechanism in the IoT World," doi: 10.1109/GLOCOMW.2018.8644494, 2018, pp. 1-6 (Year: 2018).*

* cited by examiner

METHOD FOR ENSURING SECURITY OF AN INTERNET OF THINGS NETWORK

FIELD OF THE INVENTION

The present disclosure relates to Internet of Things (IoT). In particular, the present disclosure relates to ensuring security of an IoT network. The present application is based on, and claims priority from an Indian application No. 201841031457 filed on Aug. 22, 2018 the disclosure of which is hereby incorporated by reference.

BACKGROUND OF THE INVENTION

As known, the Internet of Things (IoT) is a network comprising physical devices capable of gathering data and sharing information with each other, electronically. The edge side of the IoT network may comprise several types of devices, along with a large number of sensors, hubs and gateway(s). Each of the devices at the edge side are susceptible to security/malicious attacks that may compromise the entire IoT network. While it is easy to implement advanced security features in the devices such as gateways and cloud side of the IoT network, it is challenging to secure devices with different capabilities on the edge side and to ensure that the communication between the devices are secure. The term capabilities herein means capabilities in terms of the size of memory, computational power, etc.

This becomes all the more important, for example, when a new node is to be added to an existing IoT network and integrated into the network. The problem is further enhanced when a new, off-the-shelf, bought-out device is added to an existing IoT network and it has to be ensured that the new node does not compromise the safety and security of the existing network. There are several existing methods for ensuring security in an IoT network.

In one known method, communication line between a first device and a second device in the IoT network is secured using digital certificates. More specifically, the first device issues a digital certificate to the second device and to the communication line between the first device and the second device. Consequently, a third device cannot communicate with either the first device or the second device. However, the issuance of digital certificates among the devices does not address authentication of the devices or registration of the devices in the IoT network.

In another known method, a security mechanism for mitigating consequences of a hacked IoT network is disclosed. The security mechanism involves a first wireless network and a second wireless network established within the IoT network. The first wireless network is used by devices that are less secure and the second wireless network is used by conventionally networked devices that are more secure. The first wireless network and the second wireless network are further bridged by establishing connectivity between the first wireless network and the second wireless network. However, the use of separate wireless networks does not address prevention of security attacks.

In yet another known method, an association identification code is used for secure provisioning of a device on the IoT network by an IoT service. The secure provisioning involves generating and storing an association between a new device identification code and an association identification code present in an IoT device database. Further, the association identification code is retrieved for the new device and transmitted to the IoT service. The IoT service does a lookup in the IoT device database using the association identification code to determine the device identification code. The new device is then provisioned to communicate with the IoT service using the device identification code. However, manual intervention is required to store the association identification code in the IoT device database. Further, the IoT service assumes that other participating devices are not compromised.

Thus, the existing methods, techniques and systems address specific scenarios of communication security without addressing different classes of devices. Further, a mechanism for ensuring overall security at the edge of the IoT network for various kinds of security attacks is not disclosed. The lack of security at the edge of the IoT network may pose a serious threat to several industry verticals. Therefore, there is a need for a method to ensure overall security of an IoT edge network.

BRIEF SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

A method of registering a second node by at least one first node of a network is disclosed. The method comprises a step of the second node transmitting a registration request to the first node. The registration request comprises a unique identification parameter associated with the second node, and a device status of the second node is used for indicating that the device is a bought device. The method further comprises a step of receiving, by the first node, the registration request from the second node. The method further comprises a step of accessing, by the first node, the encrypted device parameters of the second node from a smart contract stored on a public blockchain using the unique identification parameter. The encrypted device parameters comprises a device access code and a Diffie-Hellman common secret multiplier. The method further comprises a step of establishing a shared secret between the first node and the second node using the Diffie-Hellman common secret multiplier. The method further comprises a step of computing, by the first node and the second node, a symmetric key using the shared secret. The method further comprises a step of transmitting, by the first node, a registration key request to the second node. The registration key request comprises the device access code encrypted using the symmetric key. The method further comprises a step of receiving the registration key request and decrypting the registration key request, by the second node, using the symmetric key for validating the device access code. The second node validates the device access code based on a value of the device access code stored in a secure storage of the second node and transmitting the registration key response. The method further comprises a step of receiving, by the first node, a registration key response from the second node. The registration key response comprises a registration key encrypted using the symmetric key. The method further comprises a step of decrypting, by the first node, the registration key using the symmetric key and transmits a hash of the registration key to the smart contract on the public blockchain for validation against a hash of a registration key stored on the smart contract. The method further comprises a step of creating and storing, by the first node, a digital certificate for the second node. The digital certificate is stored in a permissioned blockchain upon successful validation of the registration key by the public blockchain. The method further comprises a step of updating, by the first node, a device status of the second node, on the public blockchain, for indicating that the second node is registered.

A device comprising a memory for storing at least a unique identification parameter, a device access code, a Diffie-Hellman common secret multiplier, a registration key, a symmetric key, a device status, and program instructions for carrying out the steps required for implementing the method described above and a processor communicatively and functionally coupled to the memory for executing the program instructions stored in the memory is also disclosed.

A method for secure communication between a first node and a second node is disclosed. The method comprises a step of retrieving, by the first node and the second node, Diffie-Hellman public keys of the second node and the first node, respectively, from digital certificates stored on a permissioned block chain. The method further comprises a step of establishing a shared secret between the first node and the second node using the Diffie-Hellman public keys. The method further comprises a step of independently deriving, by the first node and the second node, an ephemeral symmetric key from the shared secret. The method further comprises a step of generating, by the first node, at least one nonce, for deriving, independently, at least one Message Integrity and Authenticity key by the first node and by the second node. The method further comprises a step of encrypting and transmitting, by the first node, at least one nonce to the second node. The nonce is encrypted using the ephemeral symmetric key. The method further comprises a step of deriving, by the second node, the at least one Message Integrity and Authenticity key by decrypting the encrypted nonce received from the first node. The nonce is decrypted using the ephemeral symmetric key. The method further comprises a step of transmitting, by the second node, a message and a Message Integrity and Authenticity code determined from the derived Message Integrity and Authenticity key, to the first node. The method further comprises a step of validating, by the first node, the message received from the second node based on the Message Integrity and Authenticity code received from the second node and the Message Integrity and Authenticity key derived by the first node.

A device comprising a memory for storing at least a unique identification parameter, a device access code, a Diffie-Hellman common secret multiplier, a registration key, a symmetric key, a device status, and program instructions for carrying out the steps required for implementing the method described above and a processor communicatively and functionally coupled to the memory for executing the program instructions stored in the memory is also disclosed.

To further clarify advantages and features of the present disclosure, a more particular description of the disclosure will be rendered by reference to specific embodiments thereof, which are illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF FIGURES

The disclosure will be described and explained with additional specificity and detail with the accompanying figures in which.

Figure 1:
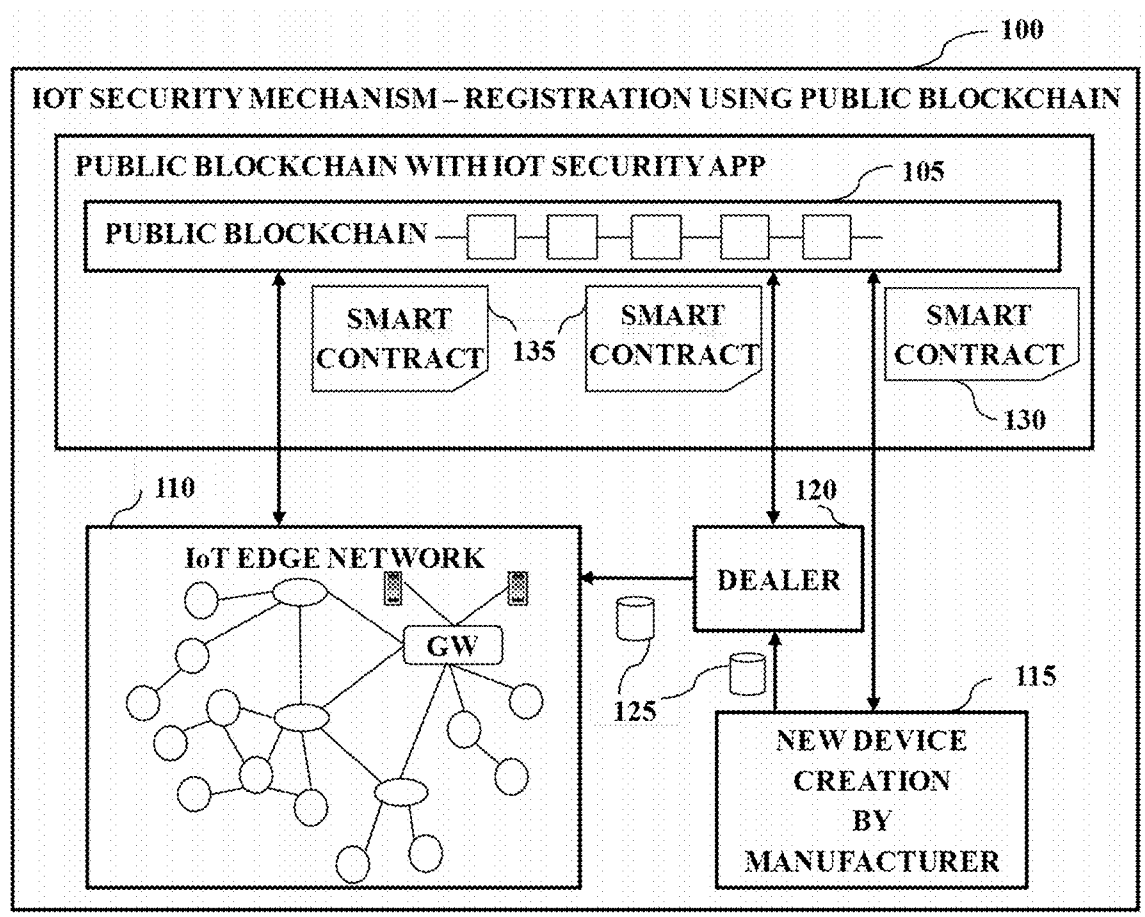
FIG. 1 illustrates a security mechanism for an Internet of Things (IoT) network, in accordance with one embodiment of the present disclosure.

Further, persons skilled in the art to which this disclosure belongs will appreciate that elements in the figures are illustrated for simplicity and may not have been necessarily been drawn to scale. Further, one or more components may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meanings as are commonly understood by one of ordinary skill in the art to which this disclosure belongs. The system, methods, and examples provided herein are illustrative only and not intended to be limiting.

As used herein, the terms "Internet of Things (IoT) device or device or node" is used to refer to any object (for example, an appliance, a sensor, etc.) that has an addressable interface (for example, an Internet Protocol (IP) address, a Bluetooth Identifier (ID), a near-field communication (NFC) ID, etc.) and can transmit information to one or more other devices over a wired or wireless means. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (for example, a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (for example, laptop or desktop computers, cell phones, etc.) in addition to devices that do not typically have Internet-connectivity (for example, dishwashers, etc.).

The present disclosure relates to a method of ensuring overall security of an edge of the IoT network (henceforth referred as IoT edge network). When a new Off-The-Shelf (OTS) device is added to the IoT edge network, the device is registered on the IoT network using a certifying authority (CA) node on the network. The CA node verifies authenticity of the device by fetching details associated with the device from a public blockchain. The public blockchain is associated with several entities such as manufacturer of the device, dealer of the device and so on. Upon registering, the device forms a node in the IoT edge network and is issued a digital certificate by the CA node. The digital certificate is stored on a permissioned blockchain within the IoT network. Further, a method of securing communication between two nodes in the network using information stored in the respective digital certificates is also disclosed.

Embodiments of the present disclosure will be described below in detail with reference to the accompanying figures.

Referring to FIG. 1, a security mechanism 100 for an Internet of Things (IoT) network is shown, in accordance with one embodiment of the present disclosure. The IoT security mechanism 100 comprises a public blockchain 105, an IoT edge network 110, a manufacturer node 115 associated with the manufacturer of an IoT device, a dealer node 120 associated with a dealer of IoT devices and a device 125. The device 125 is manufactured by the manufacturer and sold to an end-user by the dealer. In the present embodiment, the manufacturer node 115, the dealer node 120 and the IoT edge network 110 are part of the public blockchain 105. That is, each of the manufacturer node 115, the dealer node 120 and the IoT edge network 110 has at least one node as part of the public blockchain 105. The term 'node' may refer to any physical device capable of sending, receiving, and/or forwarding information within a network of other devices. The devices may include, but not limited to, a computer, a sensor module and a printer. Further, each node may be identified by a unique identification parameter on the network. The node may be one of a constrained node and an unconstrained node based on capability, in accordance with RFC 7228 Terminology. The capability may refer to RAM and Flash availability in the node. The constrained nodes may be further sub-classified into class-0 (most constrained), class-1 (less constrained) and class-2 (least constrained) as shown below based on capabilities such as Flash and RAM availability:

| Name | Data size (for example, RAM) | Code size (for example, Flash) |
|---|---|---|
| Class 0 | Much less than 10 Kilobytes | Much less than 100 kilobytes |
| Class 1 | ~10 Kilobytes | ~100 Kilobytes |
| Class 2 | ~50 Kilobytes | ~250 Kilobytes |

Further, any node that has capabilities greater than constrained nodes is classified as an unconstrained node.

Figure 2:
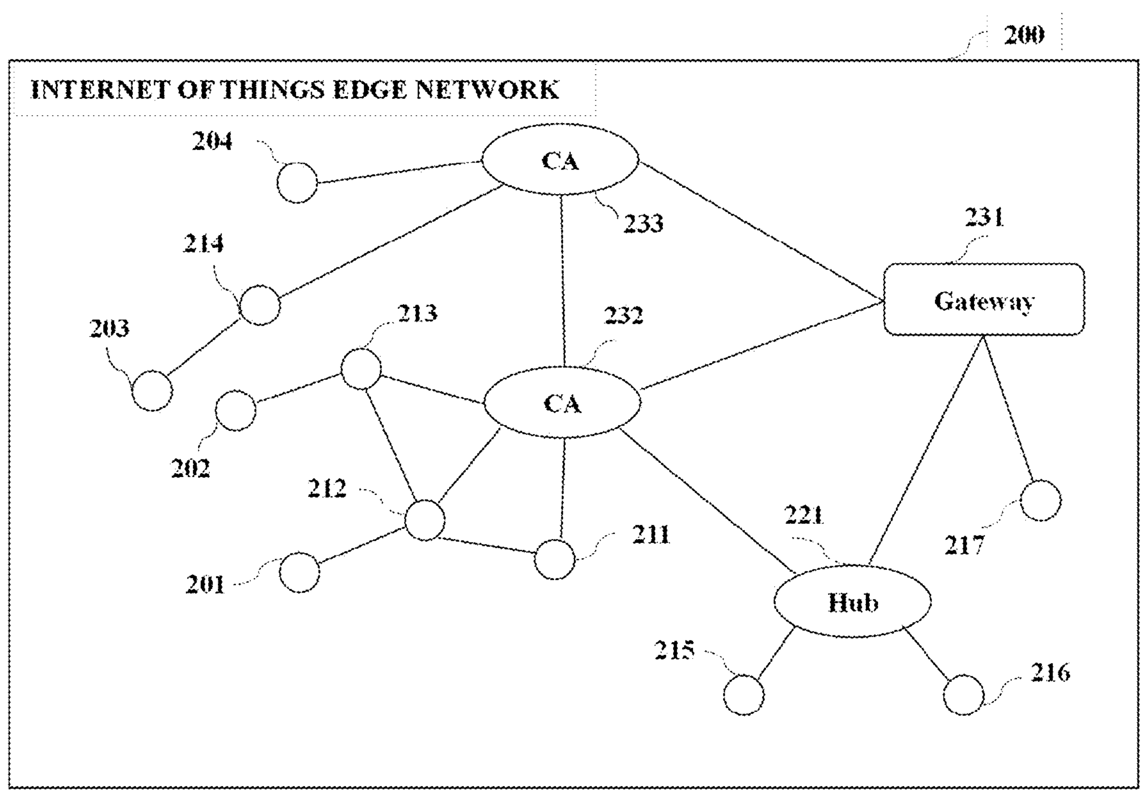
FIG. 2 illustrates an IoT edge network, in accordance with one embodiment of the present disclosure.

Referring to FIG. 2, in conjunction with FIG. 1, the IoT edge network 110 is shown, in accordance with one embodiment of the present disclosure. The IoT edge network 110 comprises a plurality of nodes. The nodes include network nodes 201, 202 . . . 217, a hub 321, a gateway node 231 and certification authority (CA) nodes 232 and 233. The network nodes 201, 202 . . . 217 are capable of sending, receiving, and/or forwarding information to other nodes. The CA nodes 232 and 233 execute instructions for registration of new nodes in the IoT edge network 110 in addition to sending, receiving and/or forwarding information to other nodes. In one embodiment, the CA nodes 232 and 233 are part of a permissioned blockchain 250 (not shown) within the IoT edge network 110. In one embodiment, the CA nodes 232 and 233 may form part of the public blockchain 105. In yet another embodiment, at least one of the CA nodes 232 and 233 may form part of the permissioned blockchain 250 within the IoT edge network 110 and may also interact with the public blockchain 105 simultaneously.

The hub 221 is one of a class-2 node and an unconstrained node. The hub 221 aggregates data from the IoT edge network 110 and performs local decision making and filtering functions. In addition, the hub 221 may also form part of the permissioned blockchain 250 within the IoT edge network 110. The gateway node 231 acts as an interface for the IoT edge network 110 to connect to an external network. In one embodiment, the gateway node 231 may also function as a CA node. Further, the gateway node 231 may form part of the public blockchain 105 and/or the permissioned blockchain 250 within the IoT edge network 110 depending on a configuration of the IoT edge network 110.

Figure 3:
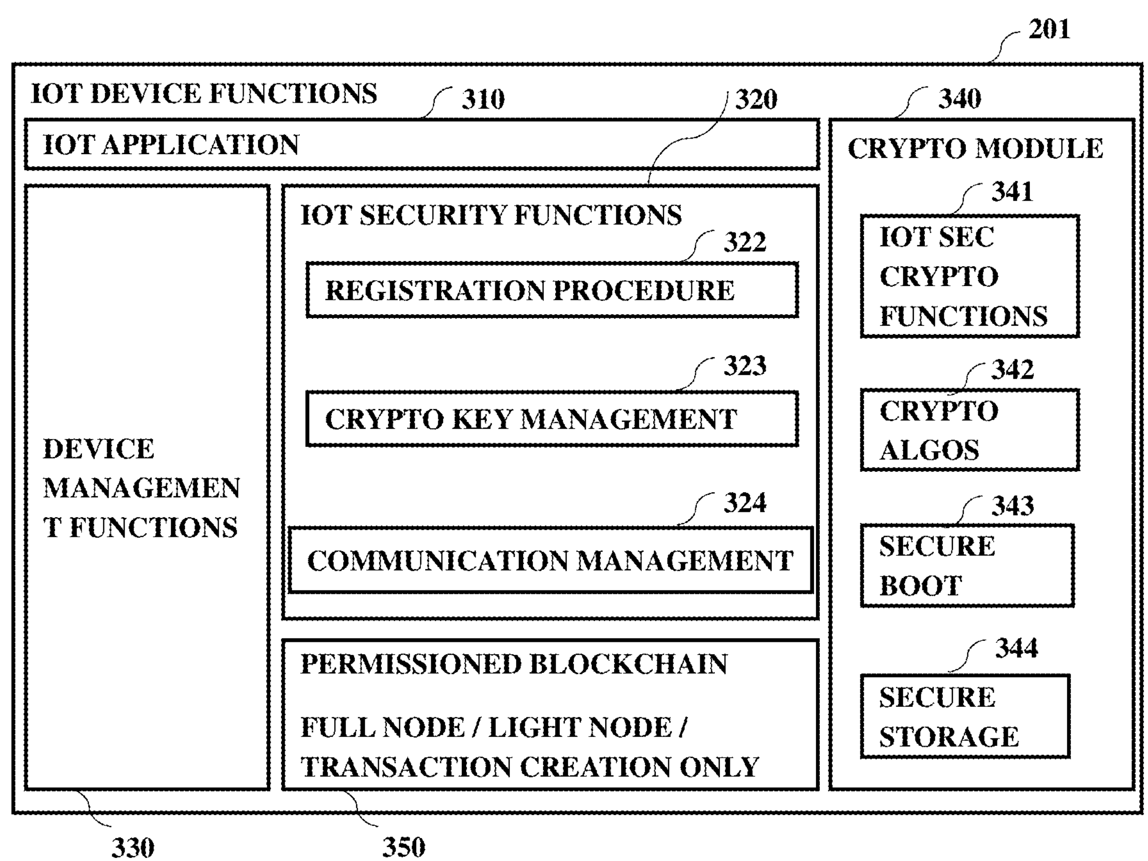
FIG. 3 illustrates functional blocks of a network node, in accordance with one embodiment of the present disclosure.

Referring to FIG. 3, in conjunction with FIG. 2, functional blocks of the network node 201 are shown, in accordance with one embodiment of the present disclosure. The network node 201 may comprise a module for executing instructions related to IoT applications 310. The network node 201 further comprises modules associated with IoT security functions 320, device management functions 330 and a cryptographic module 340. The IoT security functions 320 include registration procedure 322, crypto-key management 323 and communication management 324. The functions of the cryptographic module 340 include IoT Secure Cryptographic functions 341, cryptographic algorithms 342, secure boot 343 and secure storage 344. Further, the network node 201 may also act as data stores for implementing a permissioned blockchain module 350. The permissioned blockchain module 350 may enable the network node 201 to act as one of a full node, a light node or a transaction-only node on the permissioned blockchain 250. In full nodes, every block and associated transaction on the permissioned blockchain 250 are received and validated. Further, full nodes may take part in consensus mechanism associated with the permissioned blockchain 250. In light nodes, the permissioned blockchain 250 are not stored on the node. Instead, light nodes receive and validate the blocks and transactions. However, the transaction-only nodes are dependent on full nodes or light nodes to connect to the permissioned blockchain 250.

Figure 4:
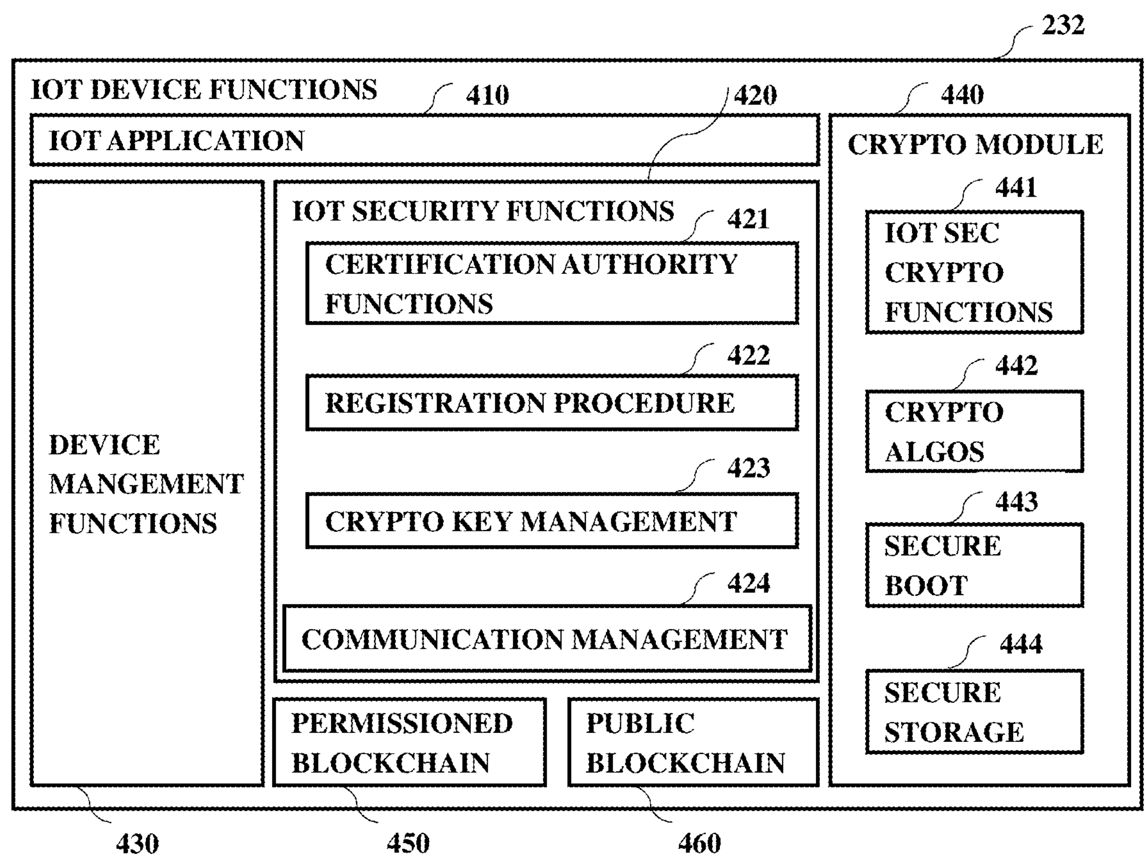
FIG. 4 illustrates functional blocks of a Certifying Authority (CA) node, in accordance with one embodiment of the present disclosure.

Referring to FIG. 4, in conjunction with FIG. 2, functional blocks of the CA node 232, is shown in accordance with one embodiment of the present disclosure. The CA node 232 may comprise a module for executing instructions related to IoT applications 410. The CA node 232 further comprises modules associated with IoT security functions 420, device management functions 430 and a cryptographic module 440. The IoT security functions 420 comprises certification authority functions 421, registration procedure function 422, crypto-key management 423 and communication management 424. The functions of the cryptographic module 440 include IoT Secure Cryptographic functions 441, cryptographic algorithms 442, secure boot 443 and secure storage 444. Further, the CA node 232 falls under the unconstrained device class and may interact with public blockchain 105. The public blockchain module 460 enables the CA node 232 to act as a node on the public blockchain 105. Further, the CA node 232 may also act as data stores for implementing permissioned blockchain module 450. The permissioned blockchain module 450 enables the CA node 232 to act as a node on the permissioned blockchain 250.

Referring back to FIG. 1, consider that the device 125 has to be registered as a node on the IoT edge network 110 upon being manufactured by the manufacturer. The device 125 may belong to one of the constrained and unconstrained classes. Upon manufacturing, the manufacturer node 115 stores device information associated with the device 125 on the public blockchain 105 by using a smart contract, for example, smart contract 130. As mentioned earlier, the manufacturer node 115 is a part of the public blockchain 105 and has a valid Digital Certificate. The device information may include, but is not limited to, Electronic Product Code (EPC), a registration key and a Device Access Code (DAC) of the device 125. The EPC is a globally unique identification code across product instances. In case there are multiple standards for uniquely identifying product instances, an identification type precedes the unique identification code in the EPC. Similarly, the registration key helps in preventing impersonation or cloning of the device 125 using the EPC. Further, the DAC is used by the device 125 to establish trust with a CA node, say 232, in the IoT network 110.

In one embodiment, the EPC, the registration key and the DAC of the device 125 and are stored in raw format in a secure storage (ROM) (secure storage 444 of FIG. 4 if the device 125 is capable of acting as a CA node and otherwise, secure storage 344 of FIG. 3) of the device 125. In addition, the device 125 also stores one of a DH common secret multiplier and a symmetric key in the secure storage. Consequently, the functions associated with secure storage act as roots of trust for the device 125. The DH common secret multiplier referred herein, may be associated with one of normal DH algorithm involving modular arithmetic and the elliptic curve DH (ECDH) algorithm. Henceforth, the term 'DH common secret multiplier' may refer to either of the variants as may be applied in different embodiments.

In another embodiment, the registration key, the DAC of the device 125 and either the DH common secret multiplier or the symmetric key may be encrypted and stored on the device 125 and a key to decrypt the device information is stored in the secure storage.

In yet another embodiment, cryptographic hash of the DAC may be stored in the secure storage of the device 125.

In one embodiment, the EPC, cryptographic hash of the registration key and encrypted DAC and either encrypted DH common secret multiplier or encrypted symmetric key along with status of the device 125 and other necessary information is stored by the manufacturer node 115 on public blockchain 105 using smart contract 130.

In yet another embodiment, the registration key may be encrypted and stored on the public blockchain 105. More specifically, the device parameters are encrypted using a public key of next entity in the distribution chain. In the present embodiment, the next entity is the dealer node 120.

When an end-user of the IoT edge network 110 purchases the device 125 from the dealer node 120, the dealer node 120 accesses the device parameters from the respective smart contract 130 on the public blockchain 105. Further, the DAC and the DH common secret multiplier or symmetric key are decrypted and re-encrypted with public key of a CA node associated with the end-user. In the present example, the public key of the CA node 232 may be used for the re-encryption. The re-encrypted DAC and DH common secret multiplier or symmetric key are further updated on a smart contract 135 in the public blockchain 105. In one example, the dealer node 120 updates a device status of the device 125 on the smart contract 135 for indicating that the device is a bought device. Consequently, any node on the IoT edge network 110 may be informed that the device 125 is already bought, when the node queries the smart contract 135. In other words, the ownership of the device 125 is transferred from the manufacturer to a single or plurality of end-users in the IoT edge network 110 via a single or plurality of intermediate entities in the distribution network. In the present example, the end-users include CA node 232 and intermediate entities include the dealer node 120. The device 125 is henceforth referred as network node 201 in the IoT edge network 110. The registration procedure of the new node 201 in the IoT edge network 110 by the CA node 232 proceeds as explained using FIG. 5.

Figure 5:
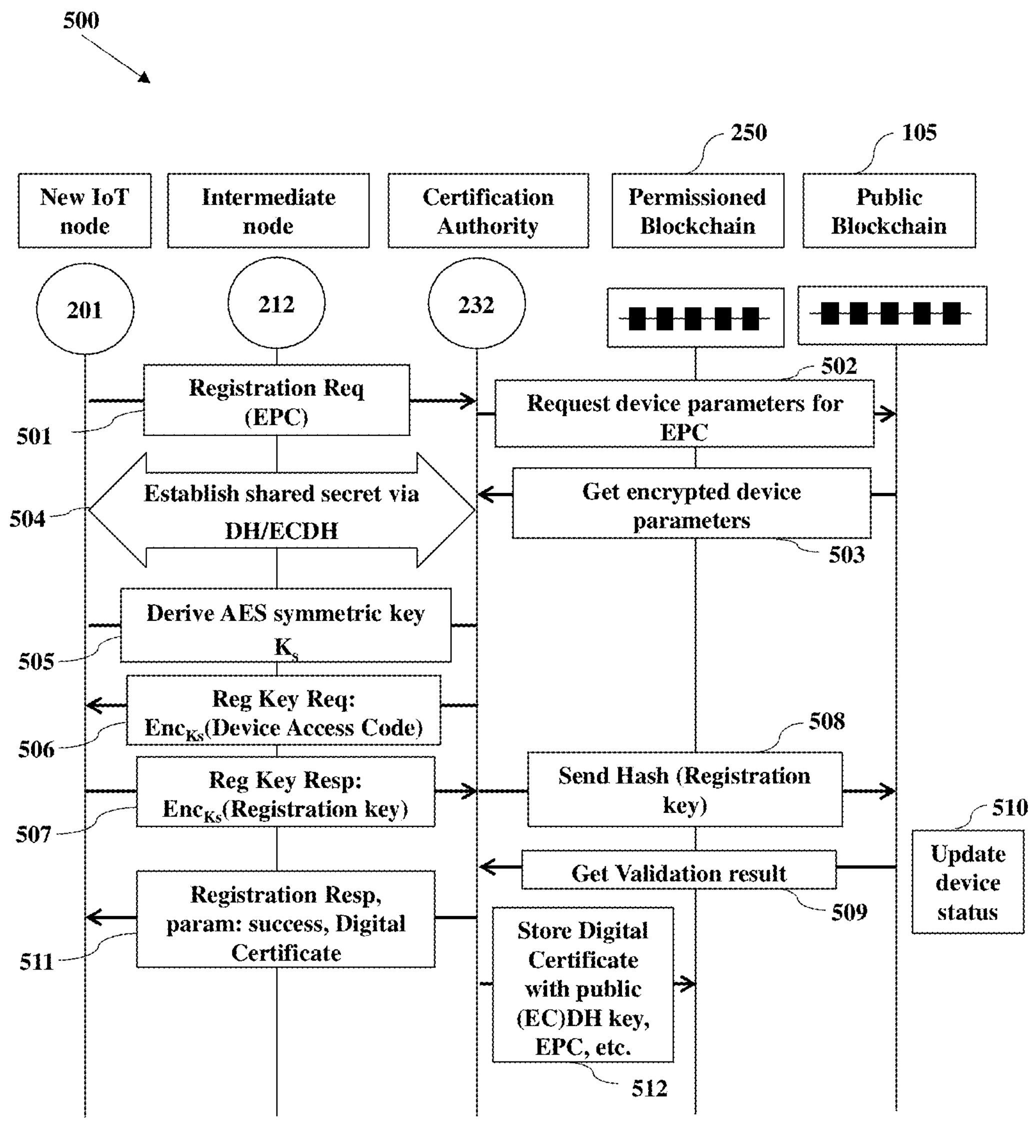
FIG. 5 shows a process of registration of a network node in an IoT edge network, in accordance with one embodiment of the present disclosure.

Referring to FIG. 5 in conjunction with FIGS. 1, 2, 3 and 4, a process 500 of registration of the network node 201 in the IoT edge network 110 is shown, in accordance with one embodiment of the present disclosure.

The process of registration begins when the network node 201 is powered on after being interfaced with the IoT edge network 110. Upon powering on, the secure boot function 343 in the Cryptographic module function 340 of the network node 201 (as shown in FIG. 3) is executed. The secure boot function 343 verifies the software signatures associated with the network node 201. After verification, the secure boot function 343 hands over control to the registration procedure 322 of the network node 201.

At step 501, the registration procedure 322 in the network node 201 establishes a communication channel with one or more nodes in the IoT edge network 110 and transmits a registration request message. The registration request comprises a unique identification parameter of the network node 201. In one example, the unique identification parameter may be the EPC. The registration request message along with the EPC is transmitted to the CA node 232. In the present example, the registration request is transmitted to the CA node 232 through the intermediate node 212. Further, the registration procedure function 422 in the CA node 232 processes the registration request message.

At step 502, the registration procedure function 422 in the CA node 232 requests for device parameters of the network node 201 from the smart contract 135 on the public blockchain 105. More specifically, the registration procedure function 422 requests for the device parameters through the public blockchain module 460 of the CA node 232 using the EPC of the network node 201. The CA node 232 may act as a full node or as a light node of the public blockchain 105. In one embodiment, the CA node 232 may query a neighboring public blockchain node for the device parameters.

At step 503, the smart contract 135 provides the device parameters to the registration procedure function 422 of the CA node 232. The device parameters include the device status in plain text as well as the DAC, and the DH common secret multiplier or the symmetric key encrypted using the public key of the CA node 232 during transfer of ownership from the dealer node 120 to end-user CA node 232. Although in the present embodiment, only the CA node 232 is considered, it must be understood that when a plurality of CA nodes are present in the IoT edge network 110, multiple copies of the device parameters may be present in the public blockchain 105. Each copy of the device parameter is encrypted with the public key of the respective CA node.

The CA node 232 further verifies that the indent and approval for procuring the network node 201 is correct using the permissioned blockchain 250. More specifically, the CA node 232 accesses the permissioned blockchain using the permissioned blockchain function 450. The permissioned blockchain function 450 further verifies that the request for registration by the network node 201 is legitimate. In one embodiment, the permissioned blockchain 250 may be extended for internal management of the organization. In the absence of a permissioned blockchain for internal management, the CA node 232 communicates with external servers to access the indent and approval status of the network node 201 for verifying the legitimacy of the registration request message.

Upon verification, the CA node 232 determines the device status of the network node 201 from the smart contract 135. If the device status is set for indicating that the device is a bought device and not registered, the CA node 232 proceeds with the rest of the authentication procedure. That is, the registration procedure function 422 in the CA node 232 invokes decryption of the encrypted DH common secret multiplier or the symmetric key and the DAC using the IoT Secure Cryptographic functions 441 in Secure Cryptographic module 440.

At step 504, the CA node 232 establishes a shared secret with the network node 201. More specifically, if the network node 201 supports DH key exchange, then DH common secret multiplier is used to arrive at the shared secret and if the network node 201 is very constrained (that is, a class-0 device), then the symmetric key stored in the public blockchain 105 and the secure storage 344 of the network node 201 is used by the CA node 232 and the network node 201 respectively as the shared secret.

More specifically, the Cryptographic Key Management function 423 of the CA node 232 sends public DH parameters to the network node 201. Subsequently, the IoT Secure Cryptographic function 341 in the network node 201 selects a first secret number α and the IoT Secure Cryptographic function 441 selects a second secret number β. Each of the first secret number α and the second secret number β as well as DH common secret multiplier, say γ meets the criteria for modular arithmetic if normal DH is used or the criteria for elliptic curve cryptography if ECDH is used. Further, the IoT Secure Cryptographic function 341 in the network node 201 multiplies the first secret number α with the DH common secret multiplier γ and the IoT Secure Cryptographic function 441 multiplies the second secret number β with the DH common secret multiplier γ.

Now consider that normal DH using modular arithmetic is used for calculating the shared secret. If "g" and "p" are parameters publicly shared between the network node 201 and the CA node 232, then the Cryptographic Algorithm function 342 in the network node 201 calculates a value A as:

$$A=g^{\alpha} \bmod(p) \quad (1)$$

Similarly, the Cryptographic Algorithm functions 442 in the CA node 232 calculates a value B as:

$$B=g^{\beta} \bmod(p) \quad (2)$$

Further, the Cryptographic Key Management function 423 in the CA node 232 and the Cryptographic Key Management function 323 in the network node 201 exchange the values A and B. Upon receiving the value A, the CA node 232 calculates the shared secret S as follows:

$$S\equiv(A)^{\beta\gamma}\equiv g^{\alpha\beta\gamma} \bmod p) \quad (3)$$

Similarly, upon receiving the value B, the network node 201 calculates the shared secret S as follows:

$$S\equiv(B)^{\alpha\beta}\equiv g^{\alpha\beta\gamma}(\bmod p) \quad (4)$$

As seen, the CA node 232 and the network node 201 arrive at the common shared secret S using the parameters publicly shared.

Alternately, consider that Elliptic Curve Diffie-Hellman is used for calculating the shared secret. The network node 201 and the CA node 232 publicly share domain parameters including a base point G and other elliptic curve domain parameters. Now, the Cryptographic Algorithm functions 342 in the network node 201 calculates a value point(A) as:

$$\text{Point}(A)=\alpha\cdot\text{Point}(G) \quad (5)$$

Similarly, the Cryptographic Algorithm functions 442 in the CA node 232 calculates a value point(B) as:

$$\text{Point}(B)=\beta\cdot\text{Point}(G) \quad (6)$$

Further, the Cryptographic Key Management function 423 in the CA node 232 and the Cryptographic Key Management function 323 in the network node 201 exchanges the values point (B) and point (A) respectively. Upon receiving the value point (A), the CA node 232 calculates the shared secret as follows:

$$\text{Shared secret: } X \text{ coordinate of } S(x,y)\equiv\beta\gamma\cdot\text{Point}(A) \equiv\alpha\beta\gamma G \quad (7)$$

Similarly, upon receiving the value point(B), the network node 201 calculates the shared secret as follows:

$$\text{Shared secret: } X \text{ coordinate of } S(x,y)\equiv\alpha\gamma\cdot\text{Point}(B) \equiv\alpha\beta\gamma G \quad (8)$$

As seen the shared secret derived by the CA node 232 and the network node 201 based on the publicly shared parameters are the same.

At step 505, the IoT Secure Cryptographic functions 441 of the CA node 232 and the IoT Secure Cryptographic functions 341 in the network node 201 derive symmetric keys of a desired length using the shared secret based on security requirements. In one embodiment, the CA node 232 and the network node 201 may calculate separate symmetric keys for each direction of communication.

In one embodiment, the CA node 232 may validate that the symmetric key calculated by the network node 201 is the same as the symmetric key generated by the CA node 232 by sending and receiving messages at the network node 201. Each of the messages sent and received comprises a hash-based message authentication code ((H) MAC) computed with the symmetric key or another key derived from the symmetric key of the network node 201.

In another embodiment, the CA node 232 may validate that the symmetric key by sending a double hash of the symmetric key generated by the CA node 232 together with a first nonce to the network node 201. The double hash of the symmetric key generated by the CA node 232 may be generated using any cryptographically strong hash function such as SHA-256. Upon receiving the double hash of the symmetric key generated by the CA node 232 and the first nonce, the network node 201 computes a double hash of the symmetric key generated by the network node 201 with the first nonce received. If the double hash value of the symmetric keys generated by the CA node 232 and the network node 201 match, then the network node 201 validates that the symmetric keys are the same.

Subsequently, the network node 201 sends a single hash of the symmetric key generated by the network node 201 and a second nonce to the CA node 232. The CA node 232 further computes single hash of the symmetric key with the second nonce received. If the single hash value of the symmetric keys generated by the CA node 232 and the network node 201 match, then the CA node 232 validates that the symmetric keys are same.

In one embodiment, mutual validation of the symmetric keys either pre-loaded in device parameters in the public blockchain 105 and secure storage or established by the network node 201 and the CA node 232 during registration is sufficient to authenticate each other and the registration may be completed at step 505 as explained above.

In another embodiment, steps 506 to 512 may be performed in place of or in addition to the steps 501 to 505, for authentication and registration of the network node 201 on the IoT edge network 110.

At step 506, the IoT Secure Cryptographic function 441 of the CA node 232 encrypts the DAC of the network node 201 using the symmetric key with the help of the Cryptographic Algorithm function 442. Further, the Registration Procedure module 422 sends the encrypted DAC to the network node 201 in a "Registration Key Request" message.

At step 507, IoT Secure Cryptographic function 341 in the network node 201 decrypts the encrypted DAC received from the CA node 232 using the Cryptographic Algorithm function 342. Upon decryption, the network node 201 compares the DAC decrypted with the DAC stored in the secure storage 344. If the DAC decrypted is the same as the DAC in the secure storage 344, then the Registration Procedure module 322 sends a Registration Key Response message along with the registration key. The IoT Secure Cryptographic function 341 encrypts the registration key with the symmetric key by using the Cryptographic Algorithm function 342. In case the DAC validation fails, Registration Procedure module 322 in the network node 201 responds with a Registration Abort message.

Upon receipt of the Registration Key Response message by the Registration Procedure module 422, the IoT Secure Cryptographic function 441 of the CA node 232 decrypts the registration key using the Cryptographic Algorithm function 442.

At step 508, the Registration Procedure module 422 sends hash of the registration key to the smart contract 135 on the public blockchain 105 using the public blockchain module 460 of the CA node 232 for validation.

At step 509, the smart contract 135 responds with a result of validation to the Registration Procedure module 422. If the result of validation is successful, then the device status is updated on the public blockchain 105 using the public blockchain module 460 as shown in step 510. Further, the Registration Procedure module 422 determines that the authentication is successful and the step 511 is performed. Otherwise, if the result of validation is unsuccessful, then the CA node 232 determines that the authentication has failed and sends a Registration Response message with a "FAILURE" parameter.

At step 511, the Registration Procedure module 422 sends a Registration Response message with a "SUCCESS" parameter and a digital certificate for the network node 201. The digital certificate includes a device identification and a DH/ECDH public key of the network node 201. More specifically, the digital certificate may include an RSA Public key (if supported by the network node 201), (Elliptic Curve) Digital Signature Algorithm((EC)DSA) public key, hash of the registration key, EPC, location and time of completion of registration and DH/ECDH public key, to enable other nodes to safely establish secure channel with the network node 201. In another implementation, the digital certificate may include a Physical Unclonable Function (PUF) based unique device fingerprint in addition or in lieu of the registration key. The unique device fingerprint may provide higher security compared to the registration key.

At step 512, the digital certificate generated at step 511 is stored on the permissioned blockchain 250 using the permissioned blockchain module 450 of the CA node 232. In addition, the IoT Application 310 of the network node 201 may also store specific application data on the permissioned blockchain 250, at regular intervals based on requirements. The specific application data thus stored provides an immutable record for audit of nodes in the IoT edge network 110 and for detection of anomalies. Other data that may be stored on the permissioned blockchain 250 include, but not limited to, configuration parameters, device status, diagnostic information, firmware details and data associated with the Device Management functions 430 of the CA node 232 and the Device Management functions 330 of the network node 201. The data may be plain text or in encrypted or in hashed form kept based on requirements and a desired security level. More specifically, the data aids the security mechanism by analysis and verification by multiple nodes and by triggering of alerts if discrepancies are found.

Upon updating the permissioned blockchain 250, the CA node 232 updates device status of the network node 201 to "Registered" in the smart contract 135 on the public blockchain 105.

In another embodiment, the network node 201 may be authenticated by a plurality of CA nodes. In one example, each of the CA nodes may establish a secure communication with the network node 201 as explained using steps 501 to 512. More specifically, each of the CA nodes obtain the registration key from the network node 201 and verify the hash of registration key with the public blockchain 105. The public blockchain 105 includes a smart contract having multiple entries of the registration key, DAC and DH common secret multiplier encrypted with public keys corresponding to each of the CA nodes. In another example, security of the CA node 232 may be ensured by another CA node, say CA node 233. Further, a second digital signature may be added by the CA node 233. After registration, integrity and authenticity of messages received by a node is ensured using the procedure as explained using FIG. 6.

Figure 6:
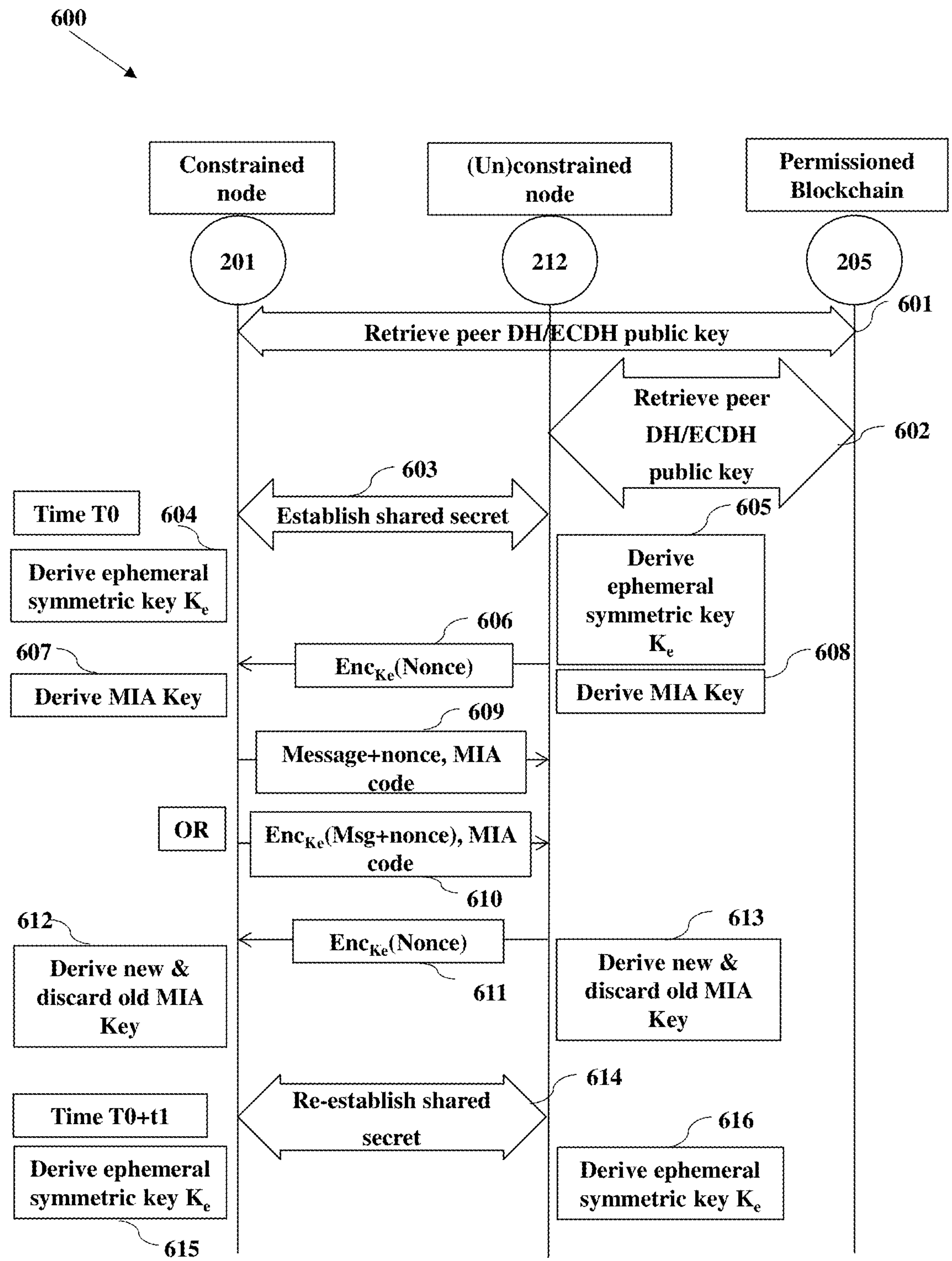
FIG. 6 shows a process of ensuring integrity and authenticity of messages exchanged between two peer nodes in an IoT edge network, in accordance with one embodiment of the present disclosure.

Referring to FIG. 6, in conjunction with FIGS. 1, 2, 3, 4 and 5, a process 600 of ensuring integrity and authenticity of messages exchanged between two peer nodes in the IoT edge network 110 is shown, in accordance with one embodiment of the present disclosure. When two peer nodes are communicating with each other, the mechanism and key length supported by the least capable node is used. For example, if among the peer nodes, the node having least capability is an unconstrained node, then asymmetric key cryptography is used with a standard 2048 bit key or higher bit length keys. In case the node is capable of encrypting or signing using asymmetric key cryptography without performing key generation, then a CA node generates a key-pair. The key-pair is further encrypted with the pre-established symmetric key and transported to the node. Depending on the key size and security requirements, key generation and transportation may happen at certain intervals.

In another example, if one of the nodes among the peer nodes is an unconstrained node having minimal computation power and limited communication ability, then a symmetric encryption technique such as AES-128 may be used.

In the present embodiment, integrity and authenticity of messages may be ensured using a peer authentication mechanism. The peer authentication mechanism may use a Message Integrity and Authenticity key (MIA Key). Further, the code derived using the MIA key may be called MIA Code. In case of constrained nodes, the peer authentication mechanism may be based on HMAC or any other mechanism that requires limited resources.

Now assume that the peer nodes are the first node 201 and the second node 212. The first node 201 may be a constrained node and the second node 212 may be one of a constrained node and an unconstrained node. Each of the nodes may access the permissioned blockchain 250.

The process of authentication begins with each of the first node 201 and the second node 212 retrieving peer DH/ECDH public keys from the permissioned blockchain 250 as shown in steps 601 and 602. More specifically, the permissioned blockchain 250 is accessed using the permissioned blockchain module 350 of the respective node.

At step 603, the DH/ECDH public key is used to establish a shared secret between the first node 201 and the second node 212. The shared secret is calculated at the first node 201 and the second node 212. The shared secret is further used to calculate an ephemeral symmetric key by the first node 201 (as shown in step 604) and the second node 212 (as shown in step 605). More specifically, the ephemeral symmetric key is established by the Cryptographic Key Management function 323 of the respective node at a time T0 using the IoT Secure Cryptographic functions 341.

In one implementation, the shared secret is validated by exchanging messages between the first node 201 and the second node 212 along with the nonce and an MIA code computed using the MIA key. For example, the first node 201 may validate the shared secret by transmitting a message along with the nonce and a keyed Hash Message Authentication Code (HMAC) to the second node 212. The HMAC is calculated based on the ephemeral symmetric key derived by the first node 201 or another key derived from the ephemeral symmetric key.

In another implementation, the first node 201 may validate the shared secret by sending a double hash of the ephemeral symmetric key with the nonce. The double hash may be generated using any cryptographically strong hash function such as SHA-256. Subsequently, the second node 212 computes a double hash of the ephemeral symmetric key of the second node 212 with the nonce received. If the double hash of the ephemeral symmetric keys with the nonce, generated by the first node 201 and the second node 212 match, then the second node 212 validates that the ephemeral symmetric key of the first node 201 is the same as the ephemeral symmetric key of the second node 212. The second node 212 further sends back a single hash of the ephemeral symmetric key of the second node 212 together with another nonce to the first node 201. The first node 201 computes a single hash of the ephemeral symmetric key with the received nonce. If the single hash of the ephemeral symmetric keys with the nonce, generated by the first node 201 and the second node 212, match then the first node 201 validates ephemeral symmetric key of the second node 212.

If modular DH key exchange protocol is used when at least one of the first node 201 and the second node 212 is an unconstrained device, then the publicly shared parameters are generated by unconstrained devices. It must be noted that the ECDH key exchange protocol is efficient and requires a key of smaller size for the same level of security as the modular DH key exchange protocol. Further, the ECDH key exchange protocol takes lesser time to generate the key when compared to the DH key exchange protocol. Therefore, the ECDH key exchange protocol is preferable over the DH key protocol for both constrained and unconstrained devices.

Assume that the second node 212 has higher capability than the first node 201. The second node 212 generates a nonce for deriving a Message Integrity and Authenticity (MIA) key at the first node 201 and the second node 212. The generation of nonce at the second node 212 reduces processing at the first node 201, that is, the less capable node, and helps in conserving power. The nonce generated is encrypted, optionally, using the ephemeral symmetric key and transmitted to the first node 201 as shown in step 606. The first node 201 further decrypts the nonce received, using the ephemeral symmetric key derived in step 605. The nonce is further used by each of the first node 201 and the second node 212 to derive the MIA key based on the shared secret, as shown in steps 607 and 608 respectively.

The first node 201 calculates an MIA code using the MIA key derived at step 608. In one example, the MIA code may be a Keyed-Hash Message Authentication Code (HMAC). The HMAC is calculated based on the ephemeral symmetric key derived by the first node 201 or another key derived from the ephemeral symmetric key. Further, in one implementation, the first node 201 may transmit a message to the second node 212 and the MIA code as shown in step 609. The MIA code helps in ensuring that the integrity of the message is preserved. In case confidentiality of messages is not required, the message may be sent as plain text. The message may further comprise a random nonce, as shown. The random nonce may be any parameter comprising a random part, and a sequential part that changes with every message transmitted between the first node 201 and the second node 212. In one example, each of the first node 201 and the second node 212 may compute the random nonce for every message. In another example, the second node 212, being the more capable node, transmits a set of encrypted parameters of size, say "m", which may be used for the next "m" messages. The transmittal of "m" encrypted parameters at once helps in optimization of communication between the first node 201 and the second node 212. The random nonce or encrypted parameters used in each message helps in eliminating chances of eavesdropping and replaying of the message by an unauthorized node.

In another implementation, the first node 201 may encrypt the message with the ephemeral symmetric key and transmit to the second node 212 along with the MIA code as shown in step 610, when confidentiality of the message is to be ensured. The message may further comprise the random nonce. Upon receiving the encrypted message, the second node 212 may use the MIA key derived at step 607, in order to authenticate integrity of the message based on the MIA code. Similarly, the second node 212 may use an MIA code calculated using the MIA key derived at step 608 to send a message to the first node 201. The first node 201 may further authenticate the message received from the second node 212 based on the MIA code.

The first node 201 and the second node 212 may further re-establish new MIA keys, if required. In order to establish the new MIA keys, the second node 212 transmits a new nonce encrypted using the ephemeral symmetric key to the first node 201 as shown in step 611. The first node 201 further uses the new nonce and the old MIA key to calculate a new MIA key at the first node 201 and the second node 212 as shown in steps 612 and 613 respectively. The function of deriving the new MIA key may be represented as below:

New MIA key=*f*(Old MIA Key,Nonce)

In order to reduce the number of messages sent between the first node 201 and the second node 212, a plurality of nonces, say ‘n’ number of nonces, may be sent at once, to the first node 201, from the second node 212. The first node 201 further uses the ‘n’ number of nonces to compute ‘n’ number of MIA keys.

Similarly, the shared secret may be re-established at time T0+t1 as shown at step 614. Further, the new shared secret may be used to derive new ephemeral symmetric key at the first node 201 and the second node 212 as shown at steps 615 and 616 respectively.

It must be understood that the ephemeral symmetric key, the MIA key and the shared secret along with other sensitive parameters are stored in the secure Crypto Module 340 or in the RAM of the respective node. Consequently, if the node is disconnected from a power supply, the parameters stored are erased.

In one embodiment, a less constrained node (such as class-1 or class-2 nodes) may re-encrypt and digitally sign on behalf of more constrained nodes (such as class-0 or class-1 nodes respectively). Consequently, messages or communication originating from the more constrained nodes may be stored securely for longer periods of time. Further, digitally signing by less constrained nodes also helps in ensuring non-repudiation of messages generated by the more constrained nodes.

Although, the present disclosure is explained by considering that the permissioned blockchain 250 is used as an internal data store within the IoT edge network 110, a person skilled in the art may understand that any advanced database system or distributed ledger technology, may be used in place of the permissioned blockchain 250 to implement the internal data store.

In addition to the above, a secure boot mechanism ensures integrity and authenticity of the software, in a node, capable of verifying a digital signature of the software. For the digital signature verification, the secure boot mechanism uses a secure storage that stores the public key of the software vendor(s). In case of very constrained devices, it is highly likely that the software is very basic and does not change. In these cases, a cryptographic hash of the code can be burned in the secure storage in a trusted module and the secure boot code can simply compute the hash and verify the integrity of the code.

It must be understood that the CA node (as shown in FIG. 4) and the network node (as shown in FIG. 3), as disclosed herein, may be manufactured as commercially available Off-The-Shelf (OTS) devices capable of implementing the security mechanism illustrated using FIGS. 5 and 6 when connected to an IoT network. Further, any device that may possibly be connected to an IoT may be designed, by manufacturers of those devices, to incorporate the capability of implementing the security mechanism illustrated using FIGS. 5 and 6 when connected to an IoT network.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

I claim:

1. A method for registering a second node by at least one first node of a network, the method comprising: i) a step of the second node transmitting a registration request to the first node, wherein the registration request comprises a unique identification parameter associated with the second node, and wherein a device status of the second node is used for indicating that the device is a bought device; ii) a step of receiving, by the first node, the registration request from the second node; iii) a step of accessing, by the first node, the encrypted device parameters of the second node from a smart contract stored on a public blockchain using the unique identification parameter, wherein the encrypted device parameters comprises a device access code and a Diffie-Hellman common secret multiplier; iv) a step of establishing a shared secret between the first node and the second node using the Diffie-Hellman common secret multiplier; v) a step of computing, by the first node and the second node, a symmetric key using the shared secret; vi) a step of transmitting, by the first node, a registration key request to the second node, wherein the registration key request comprises the device access code encrypted using the symmetric key, vii) a step of receiving the registration key request and decrypting the registration key request, by the second node, using the symmetric key for validating the device access code, wherein the second node validates the device access code based on a value of the device access code stored in a secure storage of the second node and transmits the registration key response; viii) a step of receiving, by the first node, a registration key response from the second node, wherein the registration key response comprises a registration key encrypted using the symmetric key; ix) a step of decrypting, by the first node, the registration key using the symmetric key and transmitting a hash of the registration key to the smart contract on the public blockchain for validation against a hash of a registration key stored on the smart contract; x) a step of creating and storing, by the first node, a digital certificate for the second node, wherein the digital certificate is stored in a permissioned blockchain upon successful validation of the registration key by the public blockchain; and xi) a step of updating, by the first node, a device status of the second node, on the public blockchain, for indicating that the second node is registered, wherein the unique identification parameter, the registration key, the Device Access Code, the Diffie-Hellman common secret multiplier and the symmetric key are stored on the secure storage of the second node and in the smart contract in the public blockchain, by a first entity, upon manufacturing of the second node.

2. The method as claimed in claim 1, wherein the at least one first node is a certifying authority node.

3. The method as claimed in claim 1, wherein the unique identification parameter is an electronic product code.

4. The method as claimed in claim 1, wherein the Device Access Code, the symmetric key and the Diffie-Hellman common secret multiplier stored on the smart contract by the first entity, are encrypted using public key of a second entity or a public key of the first node of the network for transferring the ownership to one of the second entity or an end user associated with the network respectively.

5. The method as claimed in claim 1, wherein the device status is set for indicating that the device is a bought device upon transfer of ownership of the second node to the end user associated with the network.

6. The method as claimed in claim 1, further comprising a method for secure communication between the first node and the second node, the method for secure communication comprising: i) a step of retrieving, by the first node and the second node, Diffie-Hellman public keys of the second node and the first node, respectively, from digital certificates stored on a permissioned block chain; ii) a step of establishing a shared secret between the first node and the second node using the Diffie-Hellman public keys; iii) a step of independently deriving, by the first node and the second node, an ephemeral symmetric key from the shared secret; iv) a step of generating, by the first node, at least one nonce, for deriving, independently, at least one Message Integrity and Authenticity key by the first node and by the second node; v) a step of encrypting and transmitting, by the first node, the at least one nonce to the second node, wherein the nonce is encrypted using the ephemeral symmetric key; vi) a step of deriving, by the second node, the at least one Message Integrity and Authenticity key by decrypting the encrypted nonce received from the first node, wherein the nonce is decrypted using the ephemeral symmetric key; vii) a step of transmitting, by the second node, a message and a message Integrity and Authenticity code determined from the derived Message Integrity and Authenticity key, to the first node; and viii) a step of validating, by the first node, the message received from the second node based on the Message Integrity and Authenticity code received from the second node and the Message Integrity and Authenticity key derived by the first node.

7. The method as claimed in claim 6, wherein the message transmitted by the second node is encrypted using the ephemeral symmetric key.

8. The method as claimed in claim 6, wherein the message transmitted by the second node is a plain text.

9. The method as claimed in claim 6, wherein the message transmitted by the second node further comprises a random nonce.

* * * * *